United States Patent

Haller

[15] 3,687,013
[45] Aug. 29, 1972

[54] HYDRAULIC SPEED CONTROL FOR AIR CYLINDERS

[72] Inventor: Hans R. Haller, 14 Delaware St., Sidney, N.Y. 13838

[22] Filed: Dec. 23, 1970

[21] Appl. No.: 99,730

[52] U.S. Cl. .......................................................92/8
[51] Int. Cl. ..........................................B15b 15/22
[58] Field of Search ..........................92/8, 9; 91/41

[56] References Cited

UNITED STATES PATENTS

| 2,580,751 | 1/1952 | Fletcher | 92/9 X |
| 2,921,559 | 1/1960 | Herrmann | 92/8 X |
| 2,937,621 | 5/1960 | Herrmann | 92/8 X |
| 3,151,533 | 10/1964 | Hartel | 92/8 X |
| 3,264,942 | 8/1966 | Witt | 92/8 X |
| 3,390,740 | 9/1968 | Barrington | 92/9 X |
| 3,562,109 | 2/1971 | Bezold et al. | 92/8 X |

FOREIGN PATENTS OR APPLICATIONS

| 16,807 | 7/1913 | Great Britain | 92/9 |

Primary Examiner—Martin P. Schwadron
Assistant Examiner—Leslie J. Payne
Attorney—Misegades & Douglas

[57] ABSTRACT

A two-piston cylinder unit with air actuation through two separate parts controlling one piston, the other piston in an oil-filled speed control section. The hydraulic cylinder controls, or limits, the speed or movement of the air cylinder, and a specified speed rate may be achieved for any section or part of the total or complete movement by means of in-built control rods and cooperating aperture.

4 Claims, 18 Drawing Figures

Patented Aug. 29, 1972
3,687,013
2 Sheets-Sheet 1
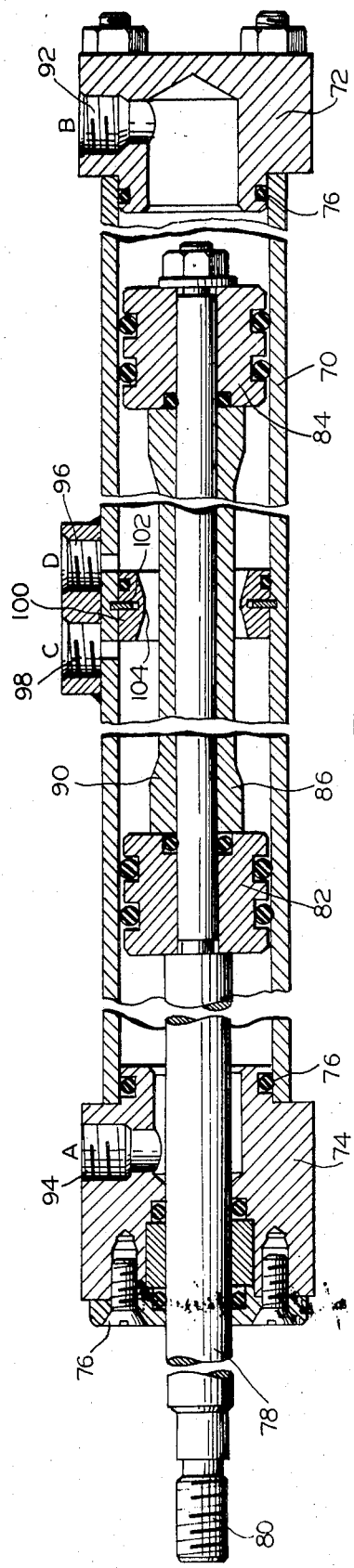
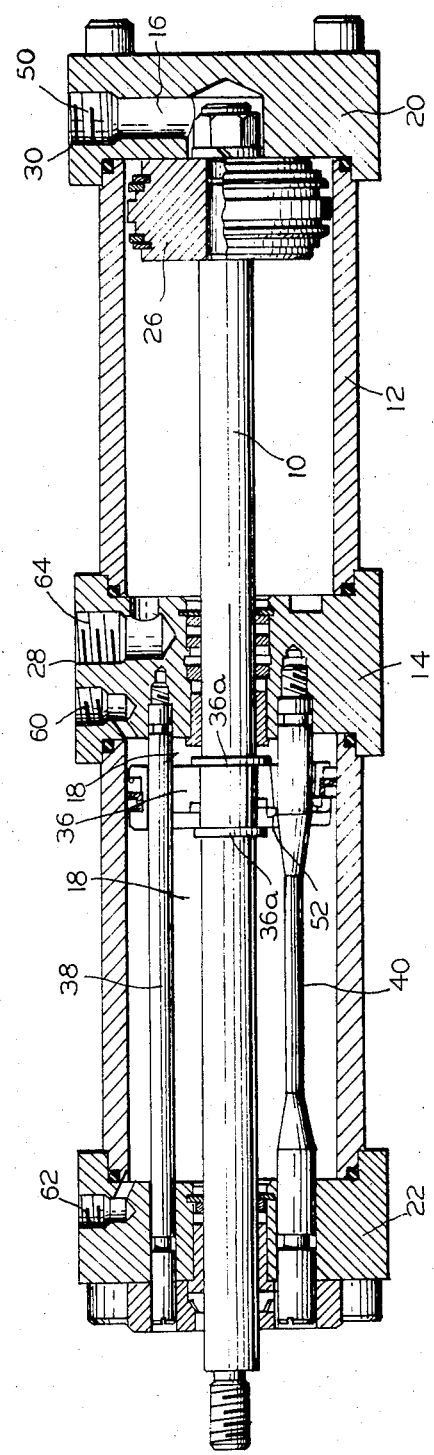
INVENTOR
HANS R. HALLER
BY Misegades & Douglas
George R. Douglas, Jr.
ATTORNEYS Patented Aug. 29, 1972
3,687,013
2 Sheets-Sheet 2
FIG.4a
FIG.4b
FIG.4c
FIG.4d
FIG.4e
FIG.4f
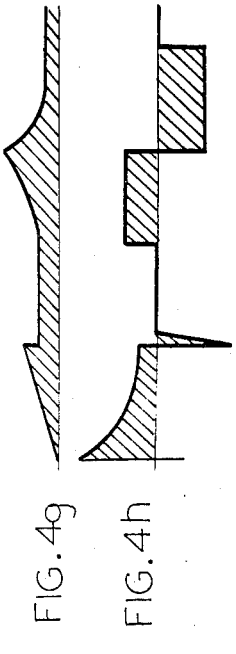
FIG.4g
FIG.4h
FIG.3a
FIG.3b
FIG.3c
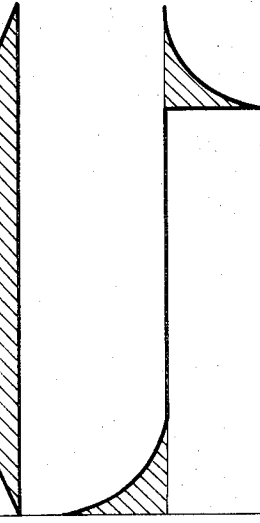
FIG.3e
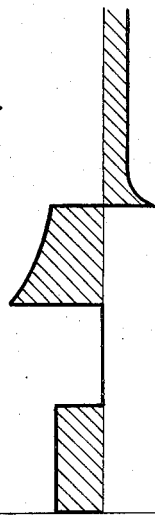
FIG.3f
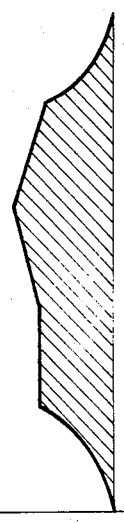
FIG.3g
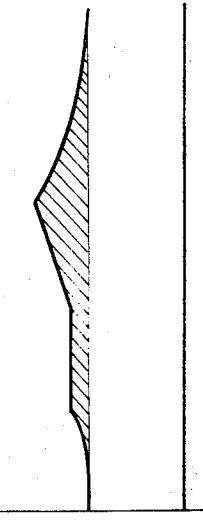
FIG.3d AND 3h
INVENTOR
HANS R. HALLER
BY *Musgrade & Douglas*
*George R. Douglas, Jr.*
ATTORNEY 3,687,013

HYDRAULIC SPEED CONTROL FOR AIR CYLINDERS

The present invention relates to a new and improved hydraulic speed-limiting control means for air cylinders, and more particularly, the invention relates to hydraulic speed control means for air cylinders wherein a piston for the hydraulic chamber and a piston for the air cylinder are mounted on a common shaft.

In the present art of speed control of air cylinders, uniform speed rates are produced except for a cushioned end-stroke area and variable speed rates are produced with an external, variable sized orifice requiring pre-setting, adjustment, and the like, such as in a flow control valve positioned between the two ports of the hydraulic cylinder section. In the present art where a certain speed change and/or acceleration-deceleration change may be required, for instance, it is necessary to use a cam-type contour connected to the cylinder shaft and actuate by mechanical means a valve located between the two hydraulic cylinder ports, thereby resulting in a controlled, including controlled variable, speed of the cylinder shaft. It is found that such devices are difficult to provide adjustments for, and the overall arrangement is rather impractical and expensive. Also the sensitivity of the controlled speed is rather restricted, and only by practice of the present invention is a wide range of control provided that is capable of adjustment without extensive redesign and re-engineering.

The present invention provides a simple two-piston cylinder system with an air chamber and an oil-filled chamber, respectively, so that air is provided to a piston in one of the chambers through a pair of ports, and hydraulic fluid or oil is filled within the other chamber having the piston, and the speed of the hydraulic piston may be controlled within specified limits as to its motion, speed and acceleration.

A further object of the invention is to provide hydraulic piston means in a cylinder that is provided to control and limit the speed of the air cylinder within a specified range, and the speed rate, or other parameter of motion, may be achieved or controlled for any section or part of the total movement of said piston.

In another embodiment of the invention, the system comprises a unit that includes a two-piston system with air actuation for driving the two-piston cylinder in selected directions, and in which there is a liquid-filled speed control section interposed between the two-piston cylinder. The hydraulic or liquid-filled section has on the cylinder wall a contour part that interacts with an interchangeable contour surface disposed over a connecting rod that spatially separates the two pistons, so that the interchangeable contour and the orifice-forming structure accordingly control the speed, acceleration and deceleration of the two pistons as they are selectively driven by the air.

A further object of the invention is seen in providing an interchangeable contour part, being shaped accordingly, that will insure any predetermined motion characteristic, such as uniform acceleration and/or deceleration, uniform speed increase and/or decrease, uniform speed, or any combination or repetition thereof as provided and controlled by said interchangeable contour part, including selective changes from one to the other within the same stroke.

The above and other objects and advantages of the invention will become apparent upon full consideration of the following detailed description and accompanying drawings in which:

FIG. 1 is a cross-sectional view of a hydraulic speed control apparatus for air cylinders, according to a preferred embodiment of the invention;

FIG. 2 is a cross-sectional view of a modification of the invention, also according to a preferred form thereof;

FIGS. 3a–h are diagrams for a control rod showing the relationship between the stroke and the speed and/or acceleration-deceleration; and FIGS. 4a–h show various interchangeable contour parts that may be used as control rods, and in which each has an individual shape according to various forms of the invention.

Referring now to the drawings, there is shown in FIG. 1 a central rod 10 coaxially disposed within the cylindrical casing or cylinder 12. Intermediate the ends of the cylinder 12 is a partition 14 serving to form in one end 16 thereof an air chamber, while in the other end 18, a hydraulic chamber. The air chamber 16 is closed off by an end partition 20, and the hydraulic chamber is closed off by an end partition 22.

The air chamber 16 includes a piston 26 secured to the rod 10, and piston 26 is driven selectively forward and return by the application of air applied to one of the ports 28, 30, and which is seen to drive the piston 26 to the low pressure portion of the air chamber.

The speed, velocity, and/or acceleration-deceleration of the piston rod 10 is controlled by the apparatus and system in the hydraulic cylinder formed between partitions 14, 22. A control piston 36 is secured also to rod 10 by means 36a, 36a, and moves throughout the length of the hydraulic chamber in the same fashion as the piston 26 moves throughout the length of the air chamber. Positioned between the partitions 14, 22 are guide rods or guide members 38 and interchangeable contour elements or contour parts 40.

When air or any gas is connected to port 50, the piston 26 extends toward the left in FIG. 1, or retracts away from the port 30 and the end 20. This also causes the piston 36 to move toward the left in the hydraulic chamber. If controlled speed rate in only one direction is desired, one-way valve, such as a ball type, is placed in the control piston 36, and the rate of feed is controlled by the contour of the contour part 40 in one direction only. It is seen as the diameter of the contour part 40 diminishes, the orifice through the control piston 36 is larger and the pistons 26, 36 then move with acceleration since the hydraulic fluid is more able to pass through the orifice 52 as the diameter of the contour part diminishes, and reversely as the diameter of the contour part 50 increases, fluid passed through the orifice 52 with a slower rate; and as the control piston 36 reaches the end of its stroke, either at the left or in the other instance at the right end of the fluid chamber, the piston 36 decelerates and comes to a stop, the orifice 52 is completely closed.

There may be more than one control rod or contour part 40 in the fluid chamber, and a usual maximum of contour parts 40 in the amount of five.

For achieving a uniform speed of the piston 26, the orifice 52 in control piston 36 is substantially constant as the control piston moves along the length of the fluid chamber which amounts to the diameter of the contour part maintaining a constant cross-section throughout that portion of its length for which uniform speed is desired. Similarly, for achieving a uniform acceleration or deceleration, as well as for achieving uniform speed increase or decrease, the contour of the control rod or contour part 40 is shaped uniformly accordingly. The rate of speed at any given point of the motion is directly related to the contour of the control rod or contour part 40, respectively, to the open area between the control piston 40 and the constant orifice 52 throughout the travel of the control piston 36 along the contour part 40. The fluid for the hydraulic or fluid chamber is in volume constant, since ports 60, 62 are closed during operation. Air that collects in the air chamber as the air piston 26 is driven by air applied to port 30, is released through the air port 28.

In FIG. 2, there is shown a piston cylinder 70 having closure ends 72, 74 and secured thereon by external rods 76, 76. Coaxially within the piston cylinder 70 is a piston rod 78 having an exterior end 80 to which is connected a load means (not shown) and a pair of piston members 82, 84 secured firmly to the rod 78. The rod 78 extending between the pistons 82, 84 may be of a smaller diameter element 86 to which there is provided an attached interchangeable contour element or contour part 90.

As air is applied under pressure into an air port 92, the piston 84 is driven to the left by the force due to such air pressure, and air is drawn from the air port 94 by movement of said piston 82.

Between the pistons 82, 84 there is provided a hydraulic fluid such as oil, or the like, which is applied through a fluid port 96, and a fluid port 98. The fluid chamber connecting fluid ports 96, 98 forms a liquid-filled speed control section of the system. The rate of flow of the fluid within the control section is controlled by the orifice between the interchangeable contour part 90 and an orifice-forming means 100, which may be mounted by securing means 102, and is positioned intermediate the fluid ports 96, 98. As the orifice becomes larger, which is an effective result on the decreasing diameter of the interchangeable contour part 90, fluid passes through the orifice more quickly, and as the diameter of the interchangeable contour part is constant, the fluid flow through the orifice 104 becomes constant.

As shown in FIG. 3, Chart 3a shows the diagram for a control rod in which the area between the control rod and the orifice-forming member, such as that exemplified in either FIGS. 1 or 2, is graphically shown throughout the total stroke shown in Chart 3d. The speed achievable by such an arrangement is shown in Chart 3b, while the acceleration-deceleration available is shown in Chart 3c. Charts 3e and 3f show variations according to uniform acceleration or uniform velocity, as well as uniform increasing or decreasing speed and deceleration, accordingly. Chart 3g shows the manner in which the area between the control rod and the orifice-forming member is directly related to the charts 3e and 3f throughout the total stroke of Chart 3h.

In FIG. 4, there is shown interchangeable types of contour rods or contour elements or parts for achieving various results due to the individual shaped contours thereof. Charts 4a–4e show five rod variations, and Chart 4f shows one combination rod for achieving the speed rate shown in Chart 4g. Chart 4h shows the acceleration that is available by use of the interchangeable contour parts shown by Charts 4a through 4e, or with the combination rod 4f.

Thus, by use of interchangeable contour parts being shaped according to the method and teaching of the invention, there will be apparent that any predetermined motion characteristic, whether of uniform acceleration-deceleration, uniform velocity increase or decrease, or uniform speed of any design, may be achieved from changes of one or the other of the contours shown within the purport of the invention and within the extent of a single stroke of the piston rod.

Additional embodiments of the invention in this specification will occur to others and, therefore, it is intended that the true spirit of the invention be limited only by the appended claims and not by the embodiments described herein-above. Accordingly, reference should be made to the following claims in determining the true spirit of the invention.

What is claimed is:

1. Hydraulic speed control for air cylinders comprising a cylindrical casing, a centrally disposed rod extending substantially throughout the length of said casing, a pair of pistons secured onto and spatially disposed on said rod, means forming an air receiving chamber within said casing on a side of each of said pistons, air port means to apply air to and from said air receiving chambers, means forming a hydraulic chamber within said casing on the other side of each of said pistons, hydraulic port means to allow fluid flow to and from said hydraulic chamber, fluid port means communicating with said hydraulic chambers, a shaped interchangeable contoured part cooperatively disposed with orifice means within said hydraulic chamber, wherein as air is applied through one of the air ports to one of the air receiving chambers, the pistons are accordingly displaced and fluid is displaced from one of said hydraulic chambers to the other, conditioned on the controlled displacement effectuated by the shaped interchangeable contoured part cooperating with said orifice means.

2. The invention according to claim 1 wherein interchangeable contoured part extends between said pistons, each of said hydraulic chambers being disposed between said pistons forming a fluid driving space, and said orifice means disposed intermediate said pistons. (FIG. 2)

3. The invention according to claim 1 wherein said rod has an end to which a load means is connected.

4. The invention according to claim 2 wherein said fluid port means are disposed immediately adjacent said orifice means.

* * * * *